Patented Aug. 13, 1935

2,011,064

UNITED STATES PATENT OFFICE 2,011,064

MANUFACTURE OF RESIN

William J. Mattox, Chicago, Ill., assignor to Universal Oil Products Company, Chicago, Ill., a corporation of Delaware No Drawing. Application October 20, 1934, Serial No. 749,272

5 Claims. (Cl. 260—3)

This invention relates more particularly to the manufacture of varnish resins.

In a more specific sense the invention has reference to the production by a new and novel process of resinous materials which may be employed as substitutes for shellac and other natural gums which are employed in light volatile solvents for producing strongly coherent protective coatings upon various materials.

The natural resins used in varnish work are commonly known as fossil resins and include such naturally occurring gums as shellac, kauri, amber, copal, dammar, mastic, etc. The natural sources of supply of such materials are limited and the demand for substitutes, particularly cheap ones, has been increasing for some time. The present invention makes possible the production of large quantities of varnish gum substitutes from materials which heretofore have not been considered in the art as sources of such materials.

In one specific embodiment the present invention comprises the manufacture of varnish resins by dehydrating alkylolamines in the presence of alumina catalysts.

The alkylolamines are compounds in which the hydrogen atoms in ammonia are partially or completely replaced by aliphatic alcohol residues. Such compounds may be represented by the following formula:

$$(C_NH_{2n}OH)_m H_{3-m}N$$

Following are a few examples of compounds of this class along with their names:

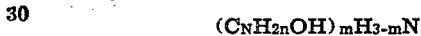
(C$_2$H$_4$OH) H$_2$N—monoethanol amine
(C$_3$H$_6$OH)$_2$HN—dipropanol amine
(C$_4$H$_8$OH)$_3$N—tributanol amine Compounds in the class of materials which may be used to form gums by dehydration according to the present process may be made by either one of two general types of reactions. Below are given some characteristic equations which show the reactions involved in the manufacture of triethanolamine, which compound has been found by experiment to be particularly adaptable to the manufacture of varnish gums by the present preferred method of catalytic dehydration:

Method I

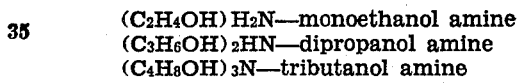

Ethylene chlorhydrin        Triethanol amine

Method II

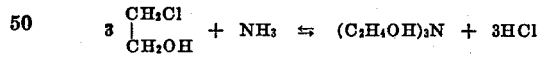

Ethylene oxide          Triethanol amine

In the above types of reactions it is not entirely possible to maintain control so as to produce only a single compound but there is always some concurrent production of mono and di derivatives which are separable by distillation of the total products. As a rule Method I is preferred because the ethylenechlorhydrin is a primary product produced by the action of hypochlorous acid upon ethylene while the ethylene oxide is a secondary product produced therefrom by alkali treatment such as, for example, with strong solutions of caustic potash.

From the above equations a description of the general methods of manufacturing alkylolamines it can be seen that they are producible primarily from olefin hydrocarbons which in turn are produced in relatively large yields in the cracking of petroleum. By substituting such hydrocarbons as propylene and the various butylenes for the ethylene shown in the equations, a considerable number of pure compounds and mixtures having the general character of alkylolamines may be manufactured, all of which are adaptable to dehydrating and condensing treatment according to the present process.

The preferred catalyst for effecting the dehydration of alkylolamines and consequently instigating condensation reactions leading to the formation of gummy and resinous products is activated alumina which may be prepared by precipitation of the aluminum hydroxide from solution followed by calcining at some temperature above 300° C. (572° F.), subsequent grinding to produce particles of the desired size and activation by superheated steam or inert gases. Apparently a small amount of moisture in the alumina renders it a more effective catalyst.

The dehydration operations are conducted by placing activated alumina particles of approximately 2–10 mesh diameter in vertical tubes which may be exteriorly heated and passing the vapors of the alkylolamines downwardly therethrough at various rates which influence the degree of dehydration of the materials and the character of the gums produced. The reaction products are passed through condenser coils and into separators in which an aqueous and an immiscible oily layer appear, the oil evidently undergoing further polymerization or condensation upon standing to form the desired gums. The temperatures used in the treatment and the rates of flow will vary with the character of the charging material and the qualities of the gum desired in respect to solubility in the usual varnish solvents and the color and hardness of the film left on evaporation thereof. In the case of triethanolamine a good shellac substitute has been produced at a temperature of 350° C. in the catalyst chamber. The oil produced from this compound has a light yellow color when steam distilled and changes to a hard resin capable of taking a high polish after standing for several days at a temperature of from 30-40° C.

In operating with other alkylolamines than triethanolamine the exact temperature which gives the optimum results in resin formation will vary somewhat. As a rule best results are obtained by using temperatures of from 50 to 100° C. above the normal boiling point of the material undergoing treatment.

The chemical nature of the gums produced by the present process cannot be determined exactly, but it is evident that they consist of high molecular weight condensation products between the residues resulting from the dehydration reactions. In any case, they are quite stable after a brief period of aging, and are generally utilizable as substitutes for ordinary varnish gums.

As one example of the manufacture of a varnish gum by the present process the following is given, although the intent is not to unduly limit the scope of the invention.

Vapors of triethanolamine were passed downwardly through a tube containing 2 to 4 mesh particles of activated alumina maintained at a temperature of approximately 350° C., at substantially atmospheric pressure. After cooling and condensing the products. a yellow oil separated out on top of an aqueous layer, this primary oil being redistilled with steam to yield a somewhat lighter colored and less viscous oil. This material when spread upon various surfaces in a thin film changed to a brown and very hard resin at ordinary temperatures and was capable of taking on a very high polish. It was fully as resistant to atmospheric and other disintegrating influences as the best types of varnish.

The novelty and utility of the invention will be evident from a consideration of the preceding specification describing its character and the example of results obtained by its use. However, neither is to be considered as imposing undue limitations upon its generally broad scope.

I claim as my invention:

1. A process for the manufacture of varnish resin, which comprises subjecting an alkylolamine to the action of an alumina catalyst at an elevated temperature above 50° C.

2. A process for the manufacture of varnish resin, which comprises subjecting monoethanol amine to the action of an alumina catalyst at an elevated temperature above 50° C.

3. A process for the manufacture of varnish resin, which comprises subjecting dipropanol amine to the action of an alumina catalyst at an elevated temperature above 50° C.

4. A process for the manufacture of varnish resin, which comprises subjecting tributanol amine to the action of an alumina catalyst at an elevated temperature above 50° C.

5. A process for the manufacture of varnish resin, which comprises subjecting triethanol amine to the action of an alumina catalyst at an elevated temperature above 50° C.

WILLIAM J. MATTOX.